(12) United States Patent
Bazukuri et al.

(10) Patent No.: US 6,563,074 B2
(45) Date of Patent: May 13, 2003

(54) METHOD OF MACHINING THE TURBINE ROTOR SHAFT OF A SUPERCHARGER

(75) Inventors: Haruo Bazukuri, Nagano-ken (JP); Kazunori Noda, Nagano-ken (JP)

(73) Assignees: Ishikawajima Mass-Produced Machinery Co., Ltd. (JP); Kiso ErectronBeam Precision Co., Ltd. (JP)

( * ) Notice: Subject to any disclaimer, the term of this patent is extended or adjusted under 35 U.S.C. 154(b) by 45 days.

(21) Appl. No.: 09/796,643

(22) Filed: Mar. 2, 2001

(65) Prior Publication Data

US 2001/0027963 A1 Oct. 11, 2001

(30) Foreign Application Priority Data

Mar. 13, 2000 (JP) ........................................ 2000-068973

(51) Int. Cl.⁷ .............................................. B23K 15/04
(52) U.S. Cl. ................................................. 219/121.14
(58) Field of Search ....................... 219/121.12, 121.13, 219/121.14, 121.35, 121.63, 121.64

(56) References Cited

U.S. PATENT DOCUMENTS 3,985,995 A * 10/1976 Brandi ........................ 219/76
4,639,194 A * 1/1987 Bell, III et al. ........... 416/241 B
5,414,929 A * 5/1995 Floser et al. .............. 416/198 R
6,201,211 B1 * 3/2001 Emmelmann ........... 219/121.63

FOREIGN PATENT DOCUMENTS

| DE | 4331827 C1 | * | 9/1993 | |
| FR | 2148901 A | * | 3/1973 | 219/121.12 |
| JP | 406254723 A | * | 9/1994 | 219/121.12 |

* cited by examiner

Primary Examiner—Samuel M. Heinrich
(74) Attorney, Agent, or Firm—Griffin & Szipl, P.C.

(57) ABSTRACT

A cylindrical boss hole 2a with a preferred tolerance is formed beforehand in the portion of a precision cast turbine blade unit 2, where it is to be joined to a rotor shaft 3. One end of the rotor shaft that has been finish machined beforehand is inserted into the hole 2a, and joint portions thereof are welded simultaneously by electron beam welding at a plurality of spots spaced at equal angles in the circumferential direction. Also, the turbine blades are machined using the outer periphery and the end surface of the previously finish machined rotor shaft as machining references. Thus, imbalances that are inevitably produced when using a conventional machining method can be greatly reduced, and the time needed to correct the imbalances is shortened and the yield of the products can be increased.

3 Claims, 9 Drawing Sheets

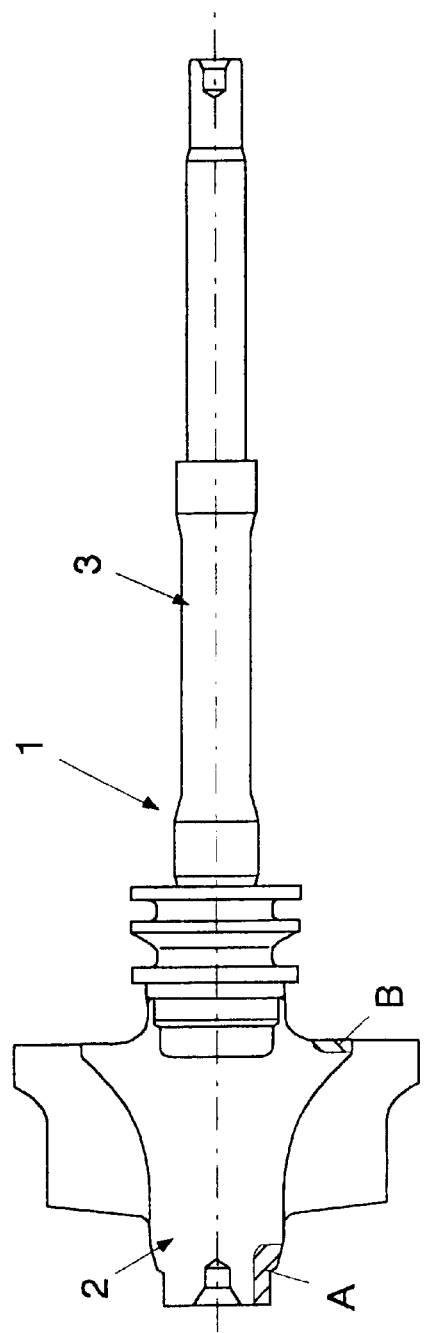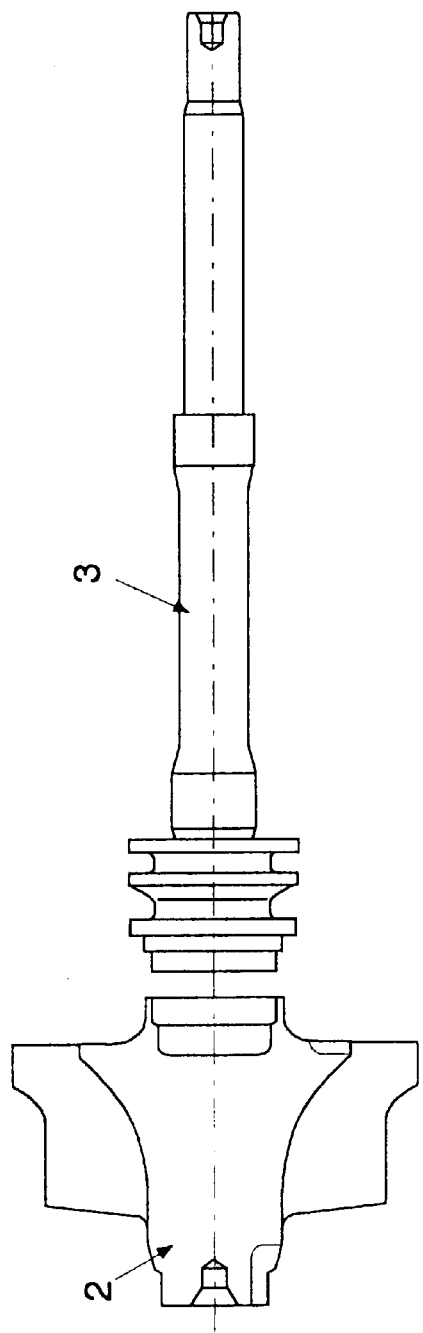
Fig.1A (PriorArt)
Fig.1B (PriorArt)

Fig.2 (PriorArt)
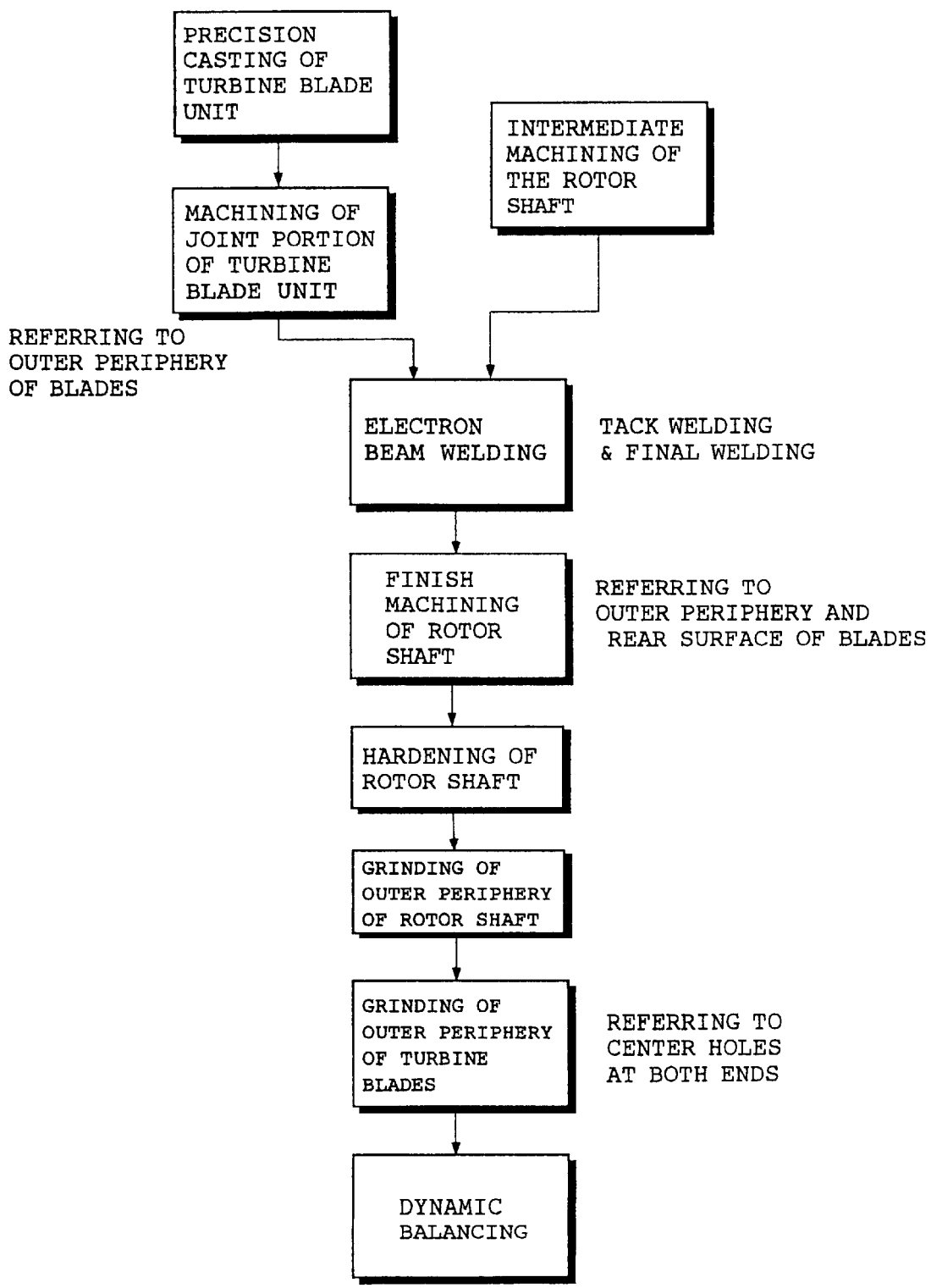

Fig.3A (PriorArt)
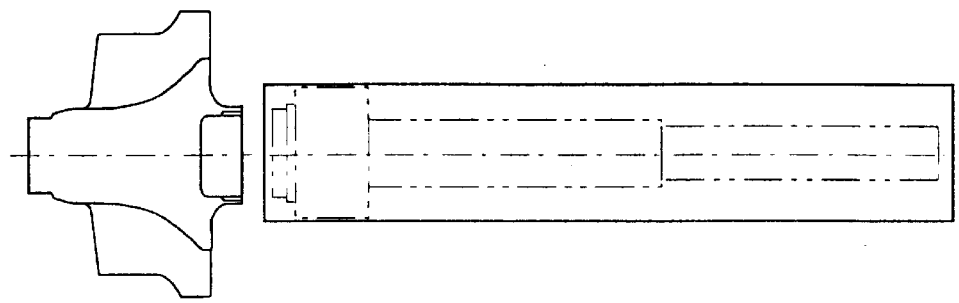
Fig.3B (PriorArt)
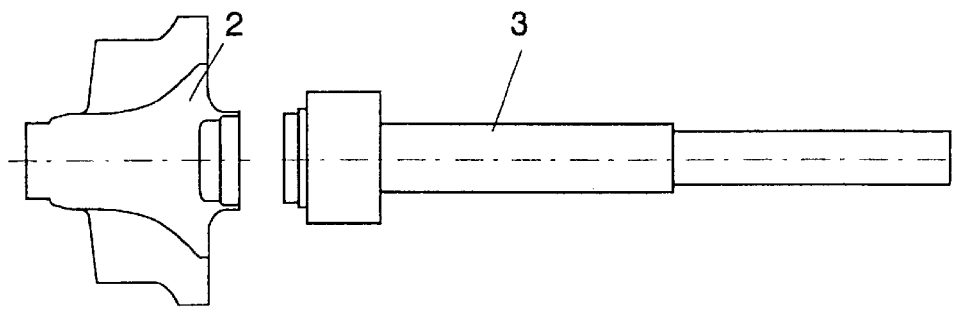
Fig.3C (PriorArt)
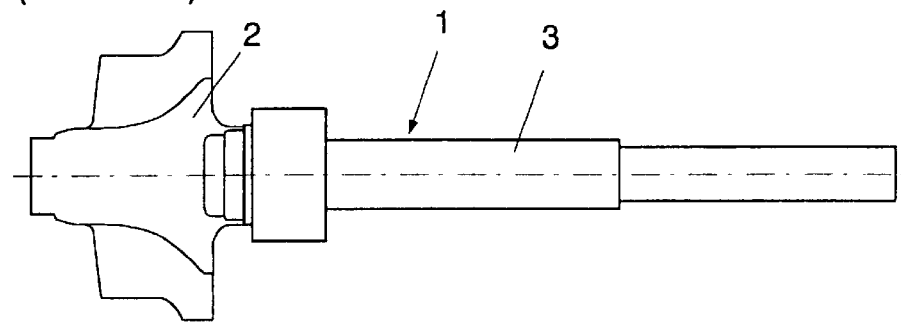
Fig.3D (PriorArt)
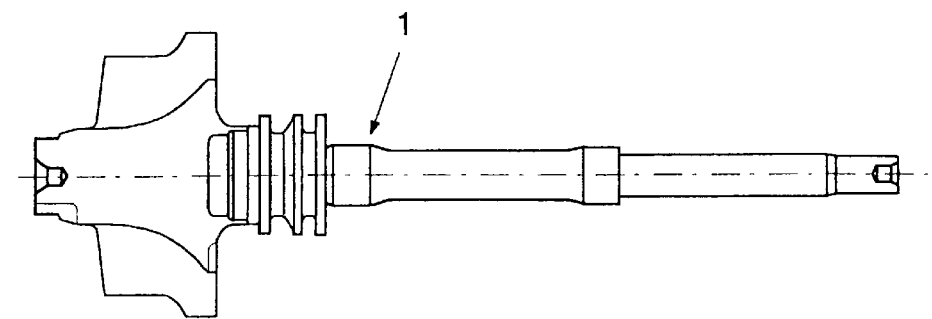

Fig.4A (PriorArt)
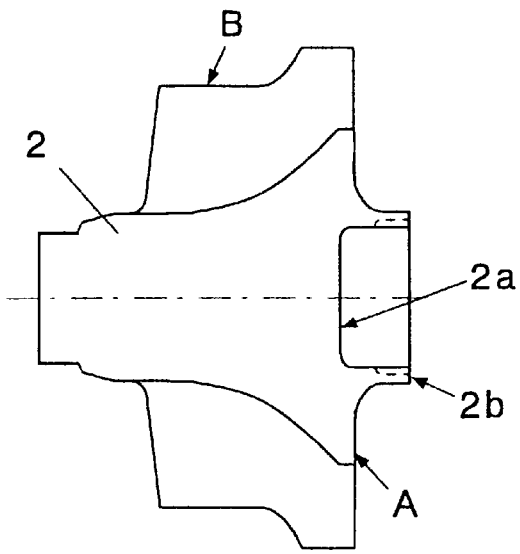
Fig.4B (PriorArt)
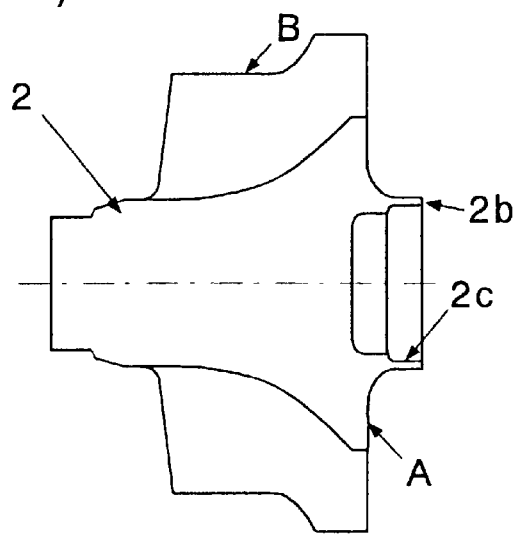

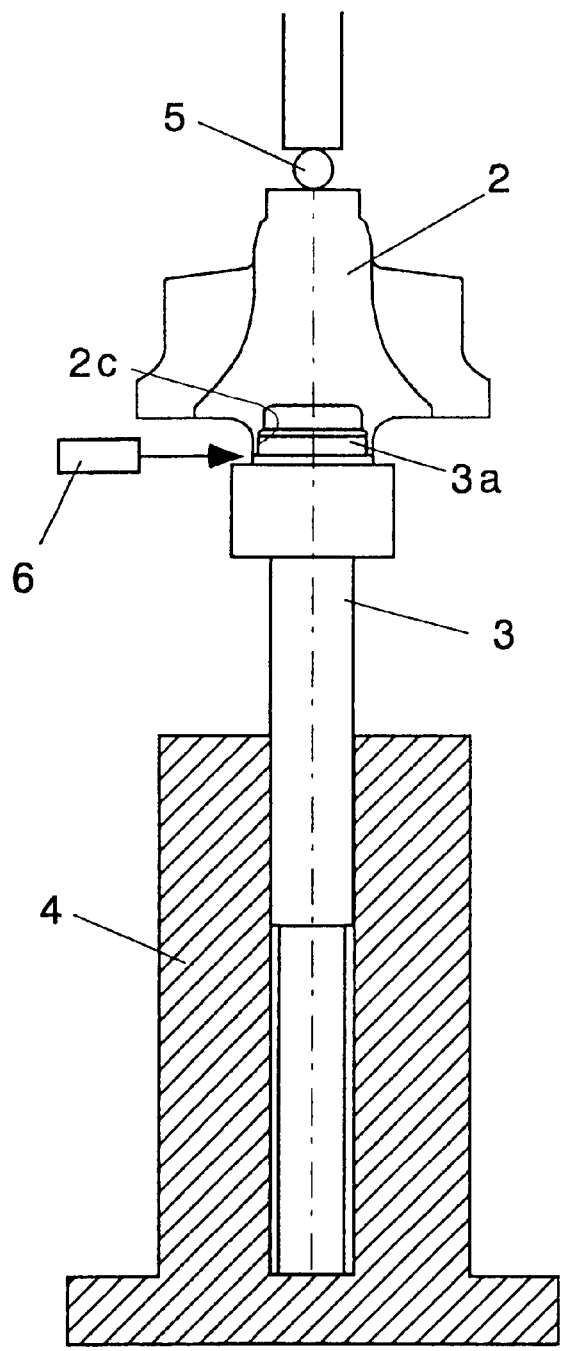
Fig.5 (PriorArt)

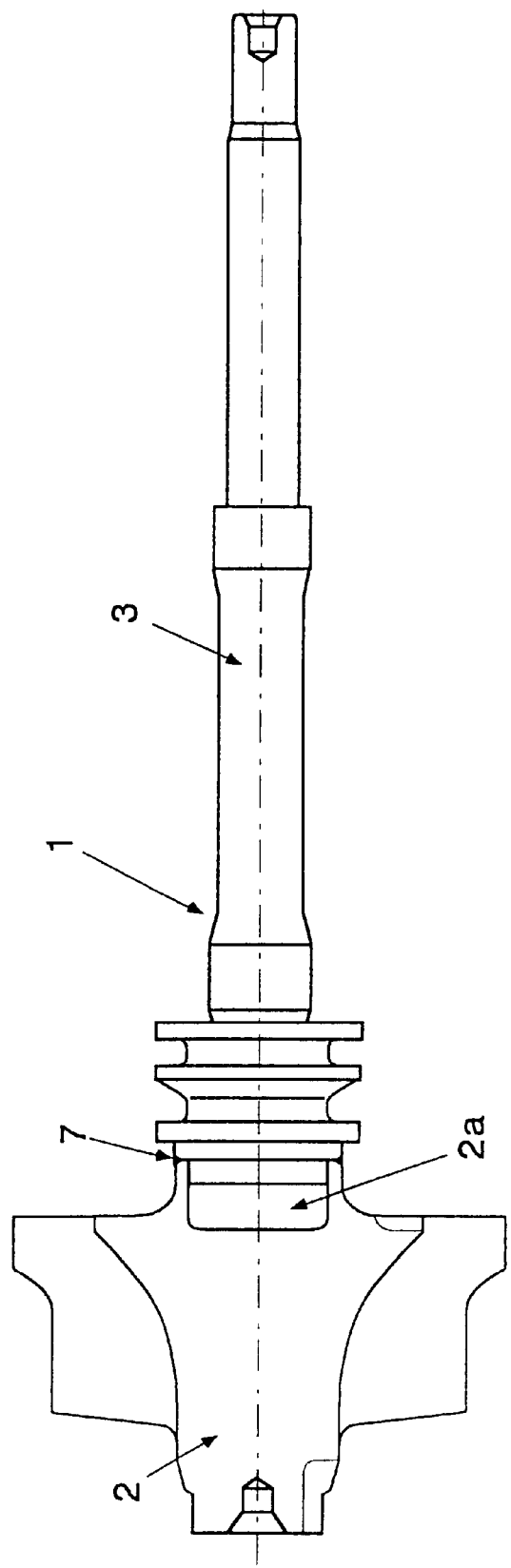

METHOD OF MACHINING THE TURBINE ROTOR SHAFT OF A SUPERCHARGER

BACKGROUND OF THE INVENTION

1. Technical Field of the Invention

The present invention relates to a method of machining the shaft of a turbine rotor for a supercharger.

2. Prior Art

FIGS. 1A and 1B show the general configuration of a turbine rotor shaft with integrated turbine blades and rotor shaft. In these figures, FIG. 1A shows a completed turbine rotor shaft 1, and FIG. 1B is a view showing the turbine rotor shaft 1 separated into the turbine blade unit 2 and the rotor shaft 3. The right hand end of the turbine rotor shaft 1 in FIG. 1A, is attached to the compressor (not illustrated) with screws to form the supercharger assembly. Such turbine rotor shafts 1, particularly small types, rotate at speeds as high as several tens or several hundreds of thousands of revolutions per minute. Therefore it is very important that they should be accurately balanced. Consequently, imbalance of the turbine rotor shaft 1 is measured by a dynamic balancing test, and then parts A and B (2 locations), hatched in the figures, are ground to eliminate the imbalance.

FIG. 2 is a flow chart of the processes used to machine a turbine rotor shaft according to a conventional method known in the prior art, and FIGS. 3A to 3D are typical views showing the corresponding steps. As shown in FIGS. 2 and 3, first the joint portion of a precision cast turbine blade unit 2, is machined, and the rotor shaft 3 is machined to an approximate shape leaving a finishing allowance (FIGS. 3A, 3B). Next, the joint portion of the turbine blade unit 2 and the rotor shaft 3 are joined by electron beam welding into an integrated turbine rotor shaft 1 (FIG. 3C). Then, the rotor shaft is finish machined, hardened (by a nitriding process or by high-frequency quenching), and the shaft and the outer periphery of the turbine blades are ground (3D). Finally, the degree of imbalance is measured by a dynamic balancing test, part of the turbine blade unit are cut to correct the imbalance, and the turbine rotor shaft 1 is completed.

FIGS. 4A and 4B show a process for machining the joint portion of the precision cast turbine blade unit 2, before and after machining, respectively. As shown in the figures, the joint portion of the precision casting is bored beforehand with a boss hole 2a, and in this machining process, the end surface 2b and the inner surface 2c of the joint portion are machined using the end surface A of the joint end and the outer periphery B of the turbine blade unit as the reference surfaces. In addition, the center hole 2d of the turbine blade unit cannot be centered when the turbine blade unit is unattached therefore the rotor shaft 3 is first welded and finish machined, and then the center hole is machined.

However, there is a problem that a large amount of imbalance is produced in the turbine blade unit 2, when this machining process according to a conventional method known in the prior art is used.

FIG. 5 is a view illustrating a process for welding the turbine blade unit 2 and the rotor shaft 3 by electron beam welding. As shown in the figure, according to a conventional electron beam welding method, the end surface 3a of the rotor shaft 3 is inserted into the inner surface 2c of the turbine blade unit 2, the entire body is held vertically using a welding jig 4, and the turbine blade unit 2 is pressed in by a ball 5. Next, in this state, the joint portion is tack welded by the head 6 of the electron beam device (with a welding angle of, for example, 360°), and finally welded (with a welding angle of, for instance, 830°).

However, this welding process according to a conventional method in the prior art is accompanied by the problem that the turbine blade unit 2 and the rotor shaft 3 are welded at a slightly skewed angle to each other.

Therefore, in the aforementioned balancing adjustment at the final stage, the amount of imbalance is often excessively large, resulting in a long time needed to make repairs, rejection of inferior workpieces, etc.

SUMMARY OF THE INVENTION

The present invention is aimed at solving these problems. That is, an object of the present invention is to provide a method of machining a turbine rotor shaft for superchargers, wherein the degree of imbalance that occurs unavoidably with conventional machining methods can be greatly reduced, thus the time needed to correct the imbalance and the yield of the workpieces can be increased.

Conventionally, the joint portion is machined using the outer periphery of the turbine blade unit as the reference for machining. However, originally the turbine blade unit was precision cast, and the blade portions, used as machining references, have complicated shapes with thin walls, and because the cast portions cool quickly, they are subject to large deformations caused by shrinkage stresses. Hence, the dimensional accuracy of these portions is not as high as is considered necessary for use as a machining reference (about ±0.02 mm), that is, actually the accuracy is about 0.2 mm. As a result, the center of the joint portion machined using the outer periphery of blades as the machining reference deviates from the center of balance of the entire turbine blade unit, so that the deviation thereof causes an imbalance of the turbine rotor shaft as a whole, as revealed in the results of measurements to be described later.

On the other hand, the center of balance of the turbine blade unit is in the center portion which cools slowly, as the ratio of the mass to the surface area thereof is larger than that of the blades. In other words, this portion is less affected by shrinkage stresses, and the accuracy thereof can be maintained rather easily. As a consequence, the finished accuracy of a boss hole in the center portion of a precision casting is as high as about ±0.01 mm, as shown by the results of measurements.

The first embodiment of the present invention is established based on the above-mentioned novel knowledge. More explicitly, according to the present invention, a cylindrical boss hole (2a) with a predetermined necessary tolerance is constructed in the joint portion of the turbine blade unit (2) which joins to the rotor shaft (3), one end of the rotor shaft previously finish machined is inserted into the boss hole, and the joint portion is welded by electron beam welding, as a novel method of machining the turbine rotor shaft of a supercharger.

Using this configuration, the imbalance that was unavoidably produced when cutting the joint portion according to the conventional method can be eliminated, and the rotor shaft can be welded with the center line of the boss hole (2a) near to the center of balance of the precision casting.

Next, in a conventional electron beam welding process known in the prior art, the turbine rotor shaft is subject to deflection due to shrinkage stresses caused when the molten metal solidifies after welding. As a result, conventional turbine rotor shafts are deflected by a mean angle of 0.14° and a 3σ value of 0.34° according to the results of measurements. This angle of deflection corresponds to a mean runout of 0.45 mm and a 3σ value of 1.09 mm at the tip of the shaft, even for the small turbine rotor shafts used for passenger cars. If such a deflection must be eliminated by grinding the outer periphery of the turbine blades, one skilled in the art may easily understand that it results in a very small yield.

Another idea that might be proposed is to mechanically clamp the turbine blades and the rotor shaft to reduce such a deflection as described above while joining them, however, this idea cannot be applied so widely and is not desirable in terms of production efficiency because the number of factors that must be controlled, such as clamping pressure, verticality of the end surface and accuracies of the jigs increases, and also a large variety of jigs are required depending on the total length of the shaft.

The second embodiment of the present invention takes into account the novel knowledge described above. In practice, according to the present invention, a plurality of components are welded on the same axis; while the plurality of components are held in position on the same axis, the joint portions are simultaneously welded together by electron beam welding at a plurality of spots spaced at equal angles around the circumference, which is a method of producing the turbine rotor shaft for a supercharger according to the present invention. According to the preferred embodiment of the present invention, the aforementioned plurality of components are the turbine blade unit (2) and the rotor shaft (3), and one end (3a) of the rotor shaft is inserted into a boss hole (2a) formed in the joint portion of the turbine blade unit, and while both the turbine blade unit and the rotor shaft are held in position on the same axis, the joint portions are simultaneously welded by electron beams at a plurality of spots spaced at equal angles around the circumference.

In this configuration, the joint portions are welded simultaneously at a number of locations spaced at equal angles, thus the effects of shrinkage as the molten metal solidifies are balanced as they are spaced at the same angle and bending distortions are reduced. The time interval and power input at each spot to be irradiated can be easily controlled by adjusting the equipment, and moreover, there are no additional factors to be controlled, so that the method is effective for increasing productivity. In addition, the quality of a workpiece is not affected by external factors such as the accuracy of jigs, therefore by applying the method, a high quality product can be manufactured.

According to a conventional electron beam welding process known in the prior art, the turbine blade unit (2) and the rotor shaft (3) are welded together, and then the rear surface of the turbine blade unit is pressed against the surface plate of a machining jig, and the outer periphery of the turbine blades is clamped by a collet chuck, and the outer periphery is machined.

However, according to this method, another imbalance is produced because the center line of the machining jig itself deviates from that of the main shaft due to the effect of the collet chuck and, as described before, the center of the circle formed by the outer periphery of the turbine blades is offset from the center of balance. In other words, although several samples are used to adjust the jig, the variations between the products are large and they cannot be accurately positioned. Also, bending distortion caused by the aforementioned electron beam welding causes a deflection of the workpiece before machining, consequently the cutting process is intermittent in practice, therefore, the machining stresses produced in the workpiece are uneven, resulting in a runout after machining is remained.

This problem is affected by variations between each product, the skill of the operators, etc., and cannot be improved so easily. In addition, there are many unstable factors concerning the accuracy of the reference sample used for machining, as well as in the machining of the joint parts, and consequently the machining operation is also another cause of imbalance.

The third embodiment of the present invention takes the above-mentioned novel knowledge into account. According to this embodiment, a method of machining a turbine rotor shaft for a supercharger is proposed, wherein the rotor shaft (3) is machined to a finished state separately, then one end of the rotor shaft is inserted into the boss hole (2a) in the turbine blade unit (2) and welded, next, using the outer periphery and the end surface of the rotor shaft as machining references, the turbine blades are machined.

Thus configured, because the rotor shaft (3) has been finish machined separately the accuracy of machining the rotor shaft can be improved, and the imbalance can be minimized. Afterwards, since one end of the rotor shaft is inserted in the boss hole (2a) in the turbine blade unit (2), and then the turbine blades are machined using the outer periphery and the end surface of the rotor shaft as machining references, the imbalance of the turbine blades can also be kept to a minimum.

Other objects and advantages of the present invention are revealed in the following descriptions and referring to the attached drawings.

BRIEF DESCRIPTION OF DRAWINGS

FIGS. 1A and 1B show the general configuration of a turbine rotor shaft with the turbine blade unit and the rotor shaft joined together.

FIG. 2 is a flow chart giving the conventional processes for machining a turbine rotor shaft.

FIGS. 3A to 3D are drawings illustrating the steps in FIG. 2.

FIGS. 4A and 4B are drawings describing the processes for machining the joint portion of a precision cast turbine blade unit 2.

FIG. 5 is an explanation drawing showing a conventional electron beam welding method.

FIG. 9 shows the general configuration of a turbine rotor shaft manufactured according to the method of the present invention.

DESCRIPTION OF PREFERRED EMBODIMENTS

The following paragraphs describe preferred embodiments of the present invention referring to the attached drawings.

Figure 6:
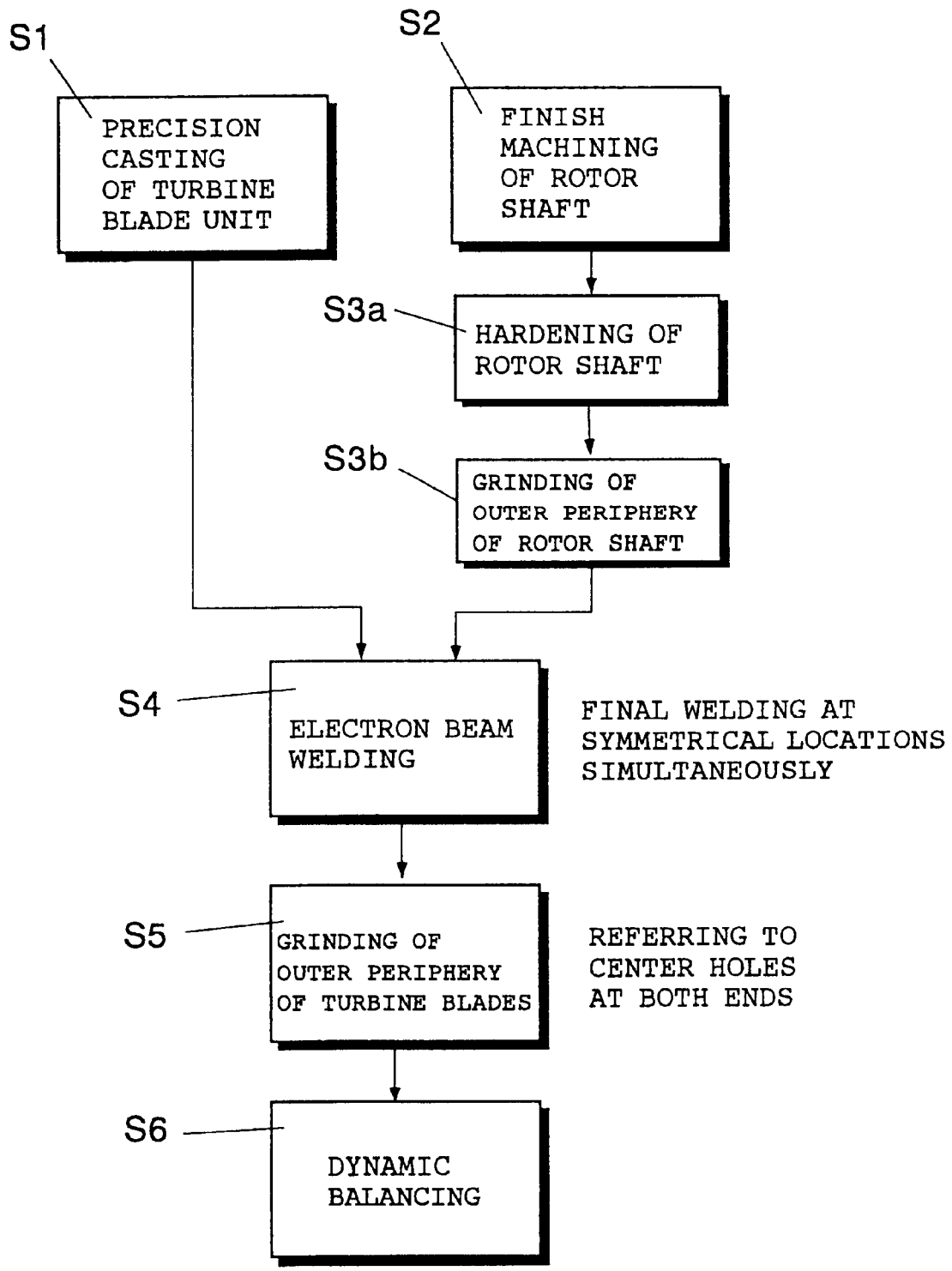
FIG. 6 is a flow chart of the processes used for machining a turbine rotor shaft according to the present invention.

FIG. 6 shows a flow chart of the processes used for machining a turbine rotor shaft according to the present invention, and FIGS. 7A to 7D are drawings illustrating the steps in FIG. 6. The processing method shown in FIG. 6 according to the present invention is comprised of the steps of precision casting S1 of the turbine blade unit, finish machining S2 of the rotor shaft, hardening treatment S3a of the rotor shaft, polishing S3b of the rotor shaft, electron beam welding S4, grinding S5 of the periphery of the turbine blades and dynamic balancing S6.

Figure 7A:
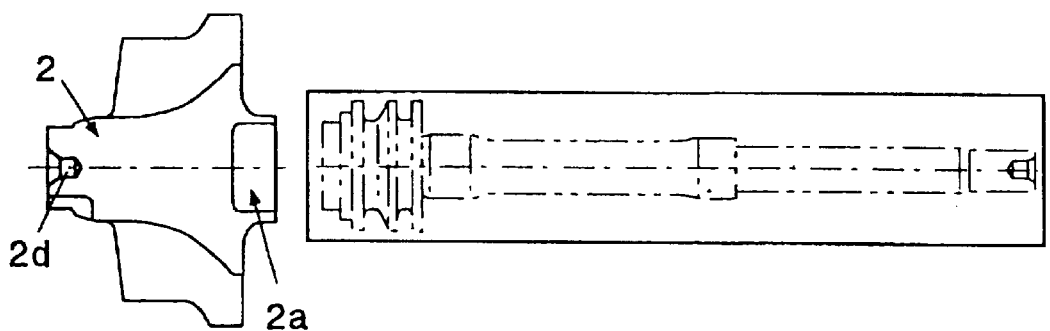
FIGS. 7A to 7D illustrate the steps in FIG. 6.

At step S1 during precision casting of the turbine blade unit, as shown in FIG. 7A, a cylindrical boss hole 2a with a predetermined tolerance is formed in the portion of the turbine blade unit 2 which is to be joined to the rotor shaft 3. The predetermined tolerance should be as small as possible so that one end of the rotor shaft can be inserted without any looseness and without the need for machining, for instance, about 0.01 mm. In addition, the center hole 2d of the turbine blade unit 2 should also be formed beforehand during the precision casting process, so as to have a similar accuracy as that of the boss hole 2a. In other respects, this precision casting process S1 is identical to the conventional method.

Figure 7B:
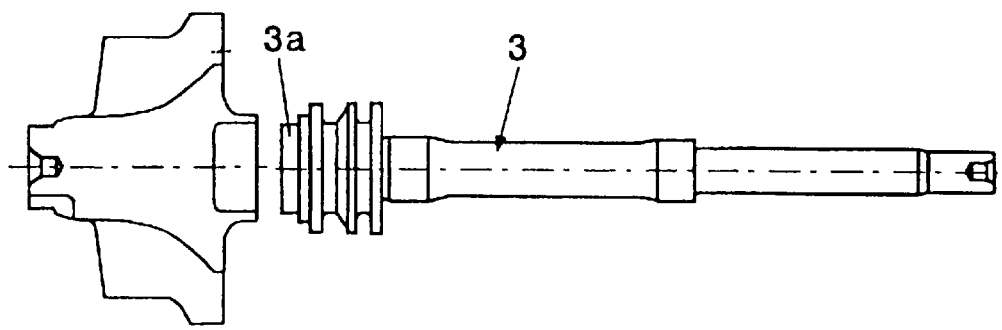

The machining process S2 for the rotor shaft differs from the conventional machining steps; the intermediate processing stage is omitted, and the rotor shaft is finish machined to the final state as a separate piece as shown in FIG. 7B. In the subsequent hardening step S3a for the rotor shaft, a necessary nitriding treatment or high-frequency heat treatment and quenching is carried out, and in step S3b for polishing the rotor shaft, the surface thereof is polished.

Figure 7C:
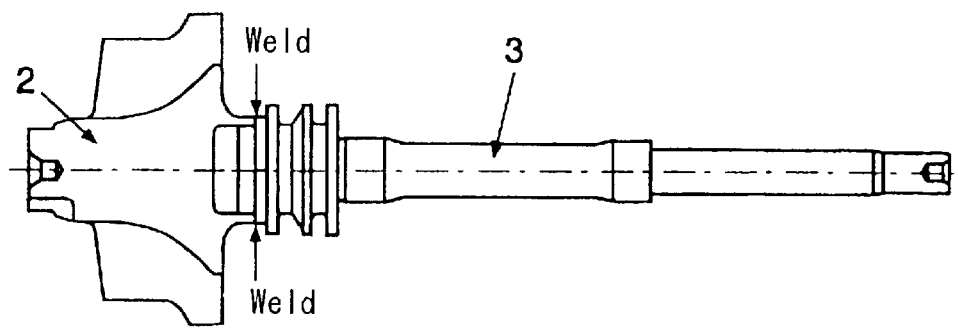

In the electron beam welding step S4, one end 3a of the rotor shaft 3, previously machined to the finish size at the finish machining step S2, is inserted into the boss hole 2a formed during the precision casting step S1 of the turbine blade unit, and as shown in FIG. 7C, the joint portions thereof are welded using electron beam welding.

Figure 7D:
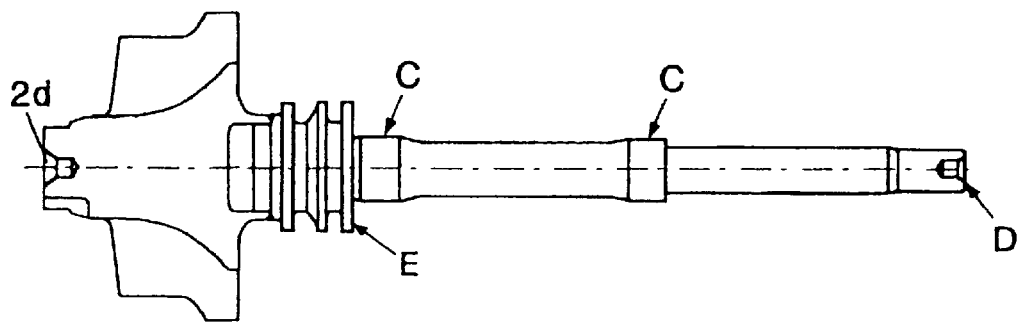

In step S5 grinding of the outer periphery of turbine blades is carried out and, as shown in FIG. 7D, the turbine blade unit 2 is machined using as machining references the outer periphery C and the end surface E of the rotor shaft 3 which was finish machined in the finish machining step S2. The blades may also be machined using the center hole D of the rotor shaft 3 and the center hole 2d of the turbine blade unit as machining references.

Figure 8:
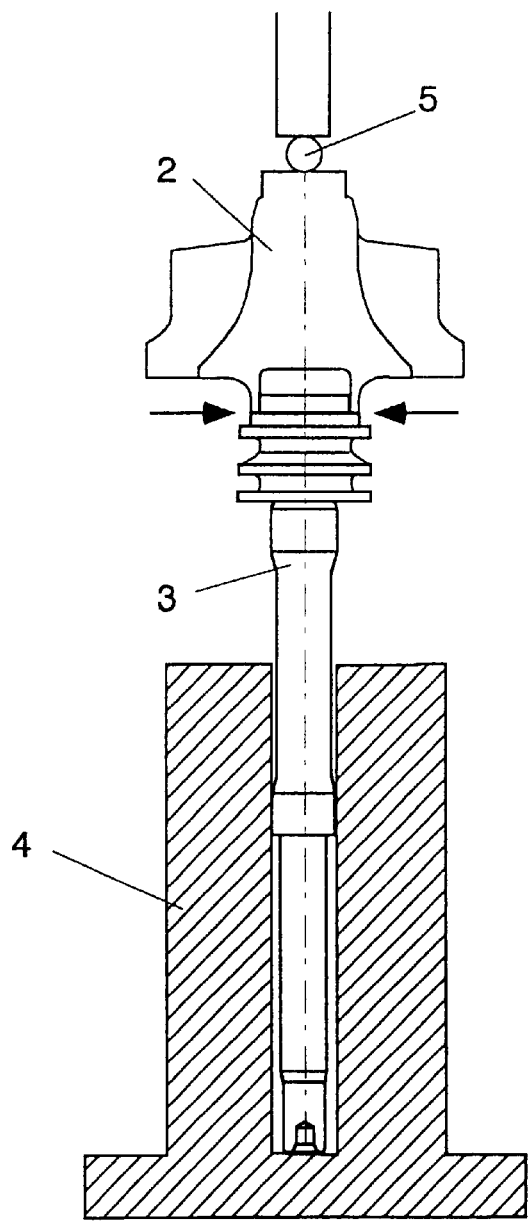
FIG. 8 is an explanation drawing describing the electron beam welding method according to the present invention.

FIG. 8 illustrates an electron beam welding process according to the present invention. In FIG. 8, in the electron beam welding step S4 as described above, one end 3a of the rotor shaft 3 is inserted into the boss hole 2a formed in the portion of the turbine blade unit 2, which is to be joined to the rotor shaft 3, and while both the turbine blade unit and the rotor shaft are held in axial alignment, the joint portions thereof are electron beam welded simultaneously at a plurality of spots equally spaced circumferentially.

To position the turbine blade unit 2 and the rotor shaft 3, in the state such that one end 3a of the rotor shaft 3 is closely engaged with the boss hole 2a of the turbine blade unit 2, the two parts are held vertically in a welding jig 4, and the end surface of the turbine blade unit 2 is held in place by a ball 5. In this operation, the vertical engagement hole in the welding jig 4 is made slightly larger than the rotor shaft 3 that has been precision finished, so that the rotor shaft 3 can be supported very accurately in a vertical direction. In addition, the ball 5 is positioned accurately on the line extending through the center line of the rotor shaft 3.

Next, unlike a conventional system no tack welding is carried out but, in this state, a plurality of welding heads 6 are used to electron beam weld the joint portions at a plurality of spots equally spaced around the periphery (for instance, two or three or more equally spaced spots).

FIG. 9 shows a general configuration of the turbine rotor shaft according to the present invention. In FIG. 9, the turbine rotor shaft 1 joined according to the method of the present invention differs from conventional shafts in that the joint portion of the turbine blade unit 2 is not machined but the cylindrical boss hole 2a is kept as formed during precision casting, and that the beginning and ending spots of the weld beads 7 between the turbine blade unit 2 and the rotor shaft 3, made by electron beam welding, are at two or more locations. In this process, two or more weld beginning or ending spots are located opposite each other (symmetrical with respect to the center line) or at equally spaced angles about the center line. Therefore, these differences can be noted by observing the welded portion of the completed turbine rotor shaft 1.

Embodiments

Embodiments of the present invention are described below.

Embodiment 1

Table 1 shows the results of balance measurements carried out on five samples of the joint portion of precision cast turbine blade units 2, before and after machining. In Table 1, T-end angles and B-end angles indicate the imbalance directions (angles) on the turbine and blower ends, respectively; T-end divisions and B-end divisions show the out-of-balance weights at the turbine and blower ends, respectively. In this example, one division represents an out-of-balance weight of about 0.005 g.

TABLE 1

Results of balance measurement

| | | T-end Angle | B-end Angle | T-end Divisions | B-end Divisions |
|---|---|---|---|---|---|
| precision casting Before machining | 1 | 130 | 140 | 40 | 45 |
| | 2 | 215 | 195 | 18 | 18 |
| | 3 | 50 | 50 | 70 | 40 |
| | 4 | 80 | 85 | 30 | 34 |
| | 5 | 35 | 30 | 70 | 85 |
| | Means | | | 45.60 | 44.40 |
| precision casting After machining | 1 | 30 | 165 | 5 | 25 |
| | 2 | 40 | 45 | 70 | 120 |
| | 3 | 60 | 65 | 50 | 140 |
| | 4 | 80 | 75 | 30 | 100 |
| | 5 | 95 | 70 | 14 | 6 |
| | Means | | | 33.80 | 78.20 |

The lower part of Table 1 (after machining) shows that the imbalance after machining the precision casting can be as large as a maximum of 140 divisions and the mean is 78 divisions at the B end after machining, and that the out-of-balance directions, at the T and B ends, in many cases are at very different angles.

Conversely, in the upper part of Table 1 (before machining), it is shown that the imbalances of the precision cast turbine blade unit 2, before machining, are a maximum of 85 divisions and the mean is 45 divisions at the T end, which are smaller than the corresponding values after machining (about one half), and the out-of-balance directions are at similar angles at the T and B ends.

Table 2 shows the results of balance measurements of 10 samples of the precision cast turbine blade unit 2, before machining. For these measurements, center holes were bored to prevent the workpieces from being runout during the balance measurements.

TABLE 2

Results of balance measurement

|   | T-end Angle | B-end Angle | T-end Divisions | B-end Divisions |
|---|---|---|---|---|
| 1 | 50 | 48 | 20 | 32 |
| 2 | 0 | 27 | 2 | 10 |
| 3 | 8 | 7 | 17 | 28 |
| 4 | 176 | 177 | 48 | 55 |
| 5 | 304 | 300 | 32 | 32 |
| 6 | 74 | 50 | 17 | 12 |
| 7 | 25 | 33 | 47 | 40 |
| 8 | 322 | 322 | 47 | 47 |
| 9 | 252 | 258 | 45 | 42 |
| 10 | 332 | 322 | 20 | 17 |
| Means | | | 29.5 | 31.5 |

This table demonstrates that the imbalances of precision cast turbine blade units 2, before machining, are even smaller, that is, the maximum is 55 divisions and the mean is 32 divisions at the B-end, which are about ⅓ of the corresponding values after machining, and there is considerable agreement between the out-of-balance directions at the T-end and B-end.

As described above, according to a conventional method, the outer periphery of the turbine blades is used as a reference for machining the joint portions, however, the portion of the blade unit, used as a reference has a complicated shape, furthermore the wall thicknesses thereof are thin, and because it cools rapidly after casting, this portion is subject to large deformations caused by shrinkage stresses. Consequently, the accuracy (about ±0.02 mm) considered necessary for a machining reference is not achieved (in practice, it is about 0.2 mm). As a result, the center of the joint portion, after machining using the outer periphery of the blades as a reference, is offset from the center of balance of the whole turbine blade unit, so it can be understood that the offset is a major cause of the imbalance of the completed turbine rotor shaft.

In addition, the center of balance of the turbine blade unit is close to the center of the center portion where the ratio of the mass to the surface area is greater than that of the blades, and which cools at a slower rate. This portion is less affected by shrinkage stresses than the other parts, and the accuracy thereof can be maintained rather easily. It was also demonstrated from these results that the accuracy of the boss hole in the center portion of the precision casting was as high as about ±0.01 mm, according to the measurements.

Therefore, according to the above-mentioned method of the present invention, the cylindrical boss hole 2a with a predetermined necessary tolerance is formed beforehand at the joint portion of the precision cast turbine 2 unit, where it is to be joined to the rotor shaft 3, one end 3a of the rotor shaft 3 that has been finish machined in advance, is inserted into the boss hole 2a, and the joint portions are welded by electron beam welding, thus the imbalance that is unavoidably produced when the joint portions are machined in the conventional method is eliminated, and the rotor shaft 3 can be welded in alignment with the boss hole 2a with its center line close to the center of balance of the precision casting.

Embodiment 2

Table 3 shows the results of measurements of runout and runout angles of 10 samples of turbine blade unit 2 and rotor shafts 3 joined together by electron beam welding according to the conventional method shown in FIG. 5.

TABLE 3

Measurements Results

| No. | Runout | Angle |
|---|---|---|
| 1 | 0.060 | 145.0 |
| 2 | 0.060 | 127.0 |
| 3 | 0.030 | 112.0 |
| 4 | 0.030 | 112.5 |
| 5 | 0.060 | 155.0 |
| 6 | 0.060 | 206.0 |
| 7 | 0.065 | 161.5 |
| 8 | 0.030 | 234.0 |
| 9 | 0.120 | 136.0 |
| 10 | 0.080 | 143.0 |

Table 3 obviously shows that rather large runouts with a mean deflection of 0.06 mm and a 3σ-value of 0.14 mm were produced by using a conventional welding methods.

More explicitly, in the conventional electron beam welding process, the turbine rotor shafts are subjected to deflection because of the contraction stresses produced when the molten metal solidifies after welding. Measurements show that, the conventional turbine rotor shaft was deflected by a mean angle of 0.14° with a 3σ-value of 0.34°. This angle corresponds to a runout with a mean value of 0.45 mm and a 3σ-value 1.09 mm at the tip for an even small turbine rotor shaft for passenger cars, and if this runout has to be removed by grinding the outer periphery of the turbine blades, the yield may obviously decrease.

Although there is another idea of mechanically clamping the turbine blade unit and the rotor shaft during welding to reduce the above mentioned deflection, the number of factors to be controlled such as the clamping pressure, verticality of the end surface and accuracy of the jig inevitably increases, and a lot of jigs must be used to cope with different shaft lengths, therefore, the idea cannot be applied widely in practice, and is not desirable in terms of production efficiency.

Therefore, according to the aforementioned method of the present invention, a plurality of components are welded together on the same axis; the plurality of components are placed together on the same center line, the joint portions thereof are electron beam welded simultaneously at a plurality of spots separated at equal angles around the circumference. That is, by means of a method of simultaneous welding at a number of spots separated at equal angles from each other, the condition of the joined portions during the shrinkage as the weld metal solidifies is balanced around the weld, and the deflection between the portions can be reduced. In addition, the time interval and a power input at each point during welding can be controlled easily by adjusting the welding equipment, and furthermore, there are no additional factors to be controlled, so the method is effective in terms of productivity. Moreover, the quality of the workpiece is not affected by external factors such as the accuracies of the product and jigs, therefore, it can also be understood that the method can be applied effectively to manufacture a high-quality product.

In a conventional electron beam welding process, after the turbine blade unit 2 and the rotor shaft 3 are welded, the back of the turbine blade unit is pressed against the surface plate of a machining jig, and the outer periphery of the turbine blades is clamped by a collet and machined. However, because the machining jig itself is not precisely aligned with the main axis due to the effect of the collet chuck, and because the center of the outer periphery of turbine blades is displaced from the center of balance, the above machining also causes an imbalance. In fact, although the jig is adjusted by balancing with samples of several chucks, the accuracy of their position is not very reliable, so the variations between each of the products are considerable. In addition, the deflection produced by the above-mentioned electron beam welding results in a runout of the workpiece to be cut, therefore the machining operation is intermittent in practice, so that the stresses caused by the machining therefor are not equally distributed and the residual stresses thereof result in a deflection after completion.

The above problem is affected greatly by variations between products, the skill of the operators, etc., so it cannot be improved so easily. Furthermore, there are many factors causing instability due to the accuracy of the machining references, such as in the case of machining the joint portions, consequently, the machining operation itself causes an imbalance.

In these circumstances, according to the aforementioned method of the present invention, the rotor shaft 3 is finish machined separately as a single unit, and then one end of the rotor shaft is inserted with a close fit into the boss hole 2a formed in the turbine blade unit 2 and joined thereto. Next using the outer periphery and the end surface of the rotor shaft as machining references, the turbine blades are machined. Thus because the rotor shaft 3 is machined and finished separately as a single unit, the accuracy of machining the rotor shaft can be increased and the imbalance can be minimized. Afterwards, since one end of the rotor shaft is inserted into the boss hole 2a provided in the turbine blade unit 2, joined by welding, and then the turbine blades are machined using the outer periphery and the end surface of the rotor shaft as machining references, the imbalance of turbine blades can also be kept to a minimum.

Although in the aforementioned embodiments, the machining of the turbine rotor shaft of a supercharger has been described, in particular the joining of the turbine blade unit 2 and the rotor shaft 3, the method of the present invention can also be applied to other cases where a plurality of components are welded together coaxially such as in the fields of vacuum parts, aviation or space components, etc.

The aforementioned present invention offers the following advantages.

1. Reduction in the degree of imbalance, that is, (1) reduction in the burden of correcting imbalances, and the number of defective parts rejected due to imbalance, and (2) improvement in the performance of the mechanical balancing operation.

2. Stabilization of the imbalance positions and magnitudes, namely (1) by use of statistical process control, and (2) by improving the tracking of the cause of any imbalance that occurs, and taking countermeasures.

3. Expediting of the machining processes, in other words, (1) reducing lead times and (2) establishing production plans.

4. Improving the uniformity of the impeller shapes, that is, (1) improving the aerodynamic performance by improving the balance of the fluid flow, and (2) reduction of noise.

In other words, assuming that the geometrical center of the component is substantially the same as the center of gravity, imbalances in the fluid flow might be closely associated with the mechanical imbalance, and the larger the mechanical imbalance, the more the fluid flow may also be unbalanced. According to a conventional machining method, although the mechanical imbalance can be corrected as the imbalance can be compensated by adjusting the weight by machining, the imbalance in the fluid flow is left unremedied. However, the balance of the fluid flow is one of the most important factors for a turbo charger, as it governs the aerodynamic performance and may cause abnormal noises, i.e. a fatal problem for a turbo charger. Under these circumstances, by machining a workpiece according to the method of the present invention in which the geometrical center of the component (center of mechanical and fluid flow balance) is used as the reference, the shape of each impeller is finished uniformly, and both an improvement in the aerodynamic performance and a reduction in the noise level can be expected.

In conclusion, the method of the present invention for machining the turbine rotor shaft of a supercharger can greatly reduce the imbalance that a conventional machining method unavoidably accompanies. Therefore, the time needed for correcting imbalances can be reduced, the yield of the products can be improved, and other preferred advantages are also obtained.

The present invention shall not be limited only to the above-mentioned embodiments, and of course, various modifications can be made as long as the scope of the claims of the present invention is not exceeded.

What is claimed is:

1. A method of machining a turbine rotor shaft for a supercharger, comprising the steps of:

forming a cylindrical boss hole with a predetermined tolerance in a joint portion of a precision cast turbine blade unit that is joinable to a rotor shaft;

inserting one finish machined end of the rotor shaft into the boss hole; and welding the joint portion of the blade unit to join to the rotor shaft by electron beam welding.

2. A method of welding a plurality of components together coaxially comprising the steps of a method of machining a turbine rotor shaft for a supercharger, wherein the method of machining a turbine rotor shaft for a supercharger comprises the steps of:

fixing a plurality of components having joint portions in position coaxially along the same axis; and welding the joint portions by electron beam welding simultaneously at a plurality of spots that are spaced at equal angles in a circumferential direction.

3. The method of welding a plurality of components together coaxially as specified in claim 2, wherein said plurality of components comprise a turbine blade unit and a rotor shaft, and one end of the rotor shaft is inserted into a boss hole formed in the turbine blade unit at a position where the boss hole is joinable to the rotor shaft, so that both the turbine blade unit and the rotor shaft are fixed in position on the same center line, the joint portions are welded by electron beam welding simultaneously at a plurality of spots that are spaced at equal angles around a circumference.

* * * * *